Dec. 8, 1925. 1,564,681

A. J. KERCHER

ELECTRICAL HEATING DEVICE

Filed April 12, 1923

WITNESS:
H. Sherburne

INVENTOR
Arthur J. Kercher.
BY
White Prost & Evans
his ATTORNEYS.

Patented Dec. 8, 1925.

1,564,681

UNITED STATES PATENT OFFICE.

ARTHUR J. KERCHER, OF BERKELEY, CALIFORNIA.

ELECTRICAL HEATING DEVICE.

Application filed April 12, 1923. Serial No. 631,497.

*To all whom it may concern:*

Be it known that I, ARTHUR J. KERCHER, a citizen of the United States, and a resident of the city of Berkeley, in the county of Alameda and State of California, have invented a new and useful Electrical Heating Device, of which the following is a specification.

This invention relates to a heating device, such as a cooking utensil heated by the aid of electrical energy. More particularly the invention relates to the arrangement of the heating element with respect to the device used therewith.

It is quite a common occurrence in the operation of electrically heated utensils, such as hot plates, percolators, or the like, that the heating element burns out and requires replacement. It is one of the objects of my invention to make it possible to replace these elements in a very simple manner.

It is still another object of my invention to produce as efficient heating as possible; in other words, to conserve the amount of electrical energy so that for a given purpose less energy need be utilized. In the heating devices of the prior art, a good deal of heat energy is lost before it is finally applied to the materials that are to be cooked. Thus in the case of a percolator or other cooking vessel, the heating element is first attached to a metallic member in some manner, and the metallic member in turn is fastened into the bottom of the vessel. There are at least two causes for the loss of heat in such an arrangement. In the first place, the heat exchanging relationship between the heating element and the metallic member is imperfect—and in the second place, there is inefficient thermal contact between the member and the interior of the cooking vessel. I overcome both of these sources of heat loss, by the proper choice of manufacturing process of the cooking utensil. Some of the advantages of my invention may also be incorporated in hot plates which are used in connection with electric ranges or independently as small cooking stoves.

My invention possesses other advantageous features, some of which, with the foregoing, will be set forth at length in the following description, where I shall outline in full those forms of the invention which I have selected for illustration in the drawings accompanying and forming part of the present specification. Although I have shown in the drawings but several embodiments of my invention, I do not desire to be limited thereto, since the invention as expressed in the claims may be embodied in other forms also.

Referring to the drawings.

Figure 1:
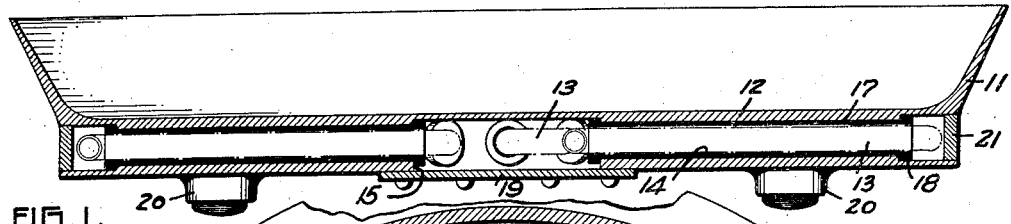
Figure 1 is a sectional view of a cooking utensil embodying my invention.
Figure 2:
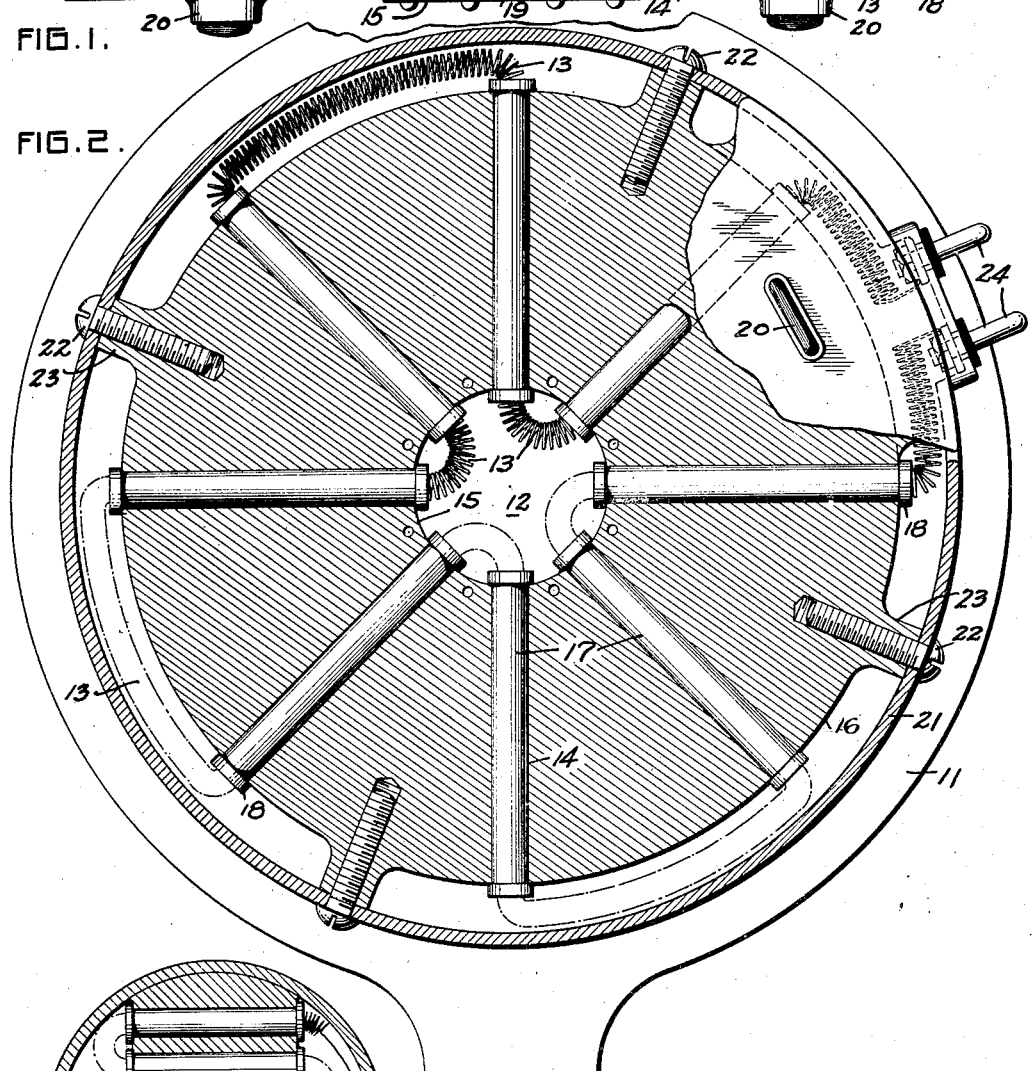
Figure 2 is a view taken from the bottom of Fig. 1, and mainly in section so as to expose the construction.

In the present instance I have shown my invention as embodied in an electrically heated frying pan, but it is of course obvious that other types of utensils may be chosen as desired. This utensil is shown as having a sloping rim 11 and a bottom portion 12, below which is disposed the electrical heating element 13. This heating element is shown in the form of a long helical coil of electrical resistance wire, and this form permits its ready flexing and accommodation even in curved passageways.

In order to provide for as close heat conducting relation between the bottom 12 of the cooking utensil and the heating element 13, I make this bottom of thick metal, and imbed the heating element directly therein, instead of using a separate casing for this element. Ordinarily it is advisable to cast the entire utensil from some good heat conducting metal, such as aluminum. By accommodating the heating element in the purposely thickened bottom of the utensil, it is assured that substantially all of the heat developed within the metal that encompasses the element 13 is conducted to the utensil. The thickened bottom 12 in the present instance is provided with substantially radial apertures 14 which extend from a central aperture 15 to the outer edge 16 of the thickened base 12, and serve to accommodate the element 13 in the manner indicated in Fig.

2, where the element is shown as threaded through the successive radial passageways.

In order to insulate electrically the element 13 from the base 12, the apertures 14 are lined with tubes or conduits 17 of refractory or vitreous material. These tubes permit the passage of heat but serve effectively as electrical insulators. One of the important advantages that may be secured by the construction shown is that these tubes or conduits 17 may be molded into the base 12 during the casting process. This merely involves using these conduits as cores in the pattern, and the metal may be poured readily around them after they are appropriately supported in the mold. Due to the greater contraction of the metal than that of the conduits as the casting cools, these conduits 17 are tightly gripped by the metal surrounding them. In this way there is a very intimate thermal contact between the conduits and the base 12. This feature is of extremely great importance in conserving energy. In prior devices it has been essential to provide insulating tubes for the heating element that have appreciable clearance in the apertures provided therefor, so that they may be readily assembled. By molding them into the base as shown, they remain intact irrespective of the number of times the heating element 13 is replaced. They form a permanent insulated guide for this element. It is thus extremely convenient to effect removal and reinsertion of the heating element, since it is merely necessary to thread it through the conduits 14. Furthermore the small clearance necessary in prior devices between the tubes and the metal surrounding them introduced a material heat loss which is avoided by the present construction. These conduits 17 may be formed with end flanges 18 so as to preclude all possibility of axial movement.

The mechanical arrangement of these and other needed parts may take any of a large number of forms. The rim 11 of the utensil extends beyond the edge 16 of the base 12, so as to form an annular space for the accommodation of those portions of the heating element which extend between the outer ends of adjacent conduits 17. A plate 19 on the bottom of the utensil may be appropriately used to cover the central aperture 15 in the base 12. Feet 20 may be provided upon which the structure may be supported. A band 21, of insulating material if necessary, may serve as a cover for the edge 16, and may be fastened in any appropriate manner as by the aid of screws 22 engaging the band and threaded into projections 23. To maintain the element 13 properly insulated, it may be necessary to use insulation in several places; but these have not been indicated since the necessity for such insulation depends upon the particular dimensions of the parts and the configuration that the heating element takes outside of the tubes or conduits 17.

In order to provide connections to the device, a pair of contact posts 24 are appropriately fastened near the base 12 and insulated therefrom. A plug of the conventional variety may be readily slipped over these posts in a well understood manner.

Figure 3:
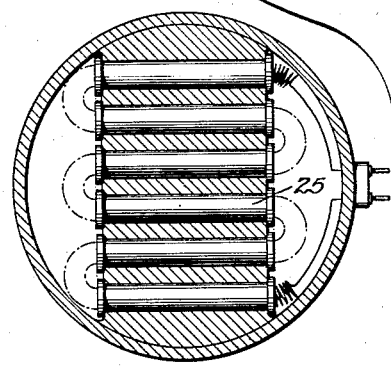
Figure 3 is a diagrammatic sectional view, similar to Fig. 2, of a modification of my invention.

It is of course possible to arrange the heating element 13 in other ways than that shown. Thus conduits 17 may take serpentine forms without making it difficult to imbed them in the metal of base 12. In the diagrammatic arrangement for example, shown in Fig. 3, the conduits 25 are parallel, so as to provide more uniform heating.

The imbedded arrangement of the conduits may be used separately in connection with hot plates or the like, or other types of heating devices, in which case the rim 11 would be eliminated from the structure.

I claim:

1. An electrical heating device comprising a metallic member formed by casting and conduits of insulating material imbedded therein in the formation of said member.

2. An electrical heating device comprising a metallic member formed by casting, conduits of insulating material imbedded therein in the formation of said member and a heating element disposed in said conduits.

3. An electrical heating device comprising a metallic member formed by casting and conduits of refractory material imbedded therein in the formation of said member.

4. An electrical heating device comprising a metallic member formed by casting, conduits of insulating material imbedded therein in the formation of said member and a heating element disposed in said conduits.

5. In an electrical cooking utensil, a cooking device having an integrally formed base, and a heating element imbedded in the base.

6. In an electrical cooking utensil, a metallic base, walls forming a cooking vessel formed integrally with the base, and a heating element imbedded in the base.

7. In an electrical cooking utensil, a cast metallic base, a conduit imbedded in the base during the casting thereof, and a heating element disposed in the conduit.

8. In an electrical cooking utensil, a cast metallic base, a conduit cast into the base so as to be imbedded therein, walls forming a cooking space cast integrally with the base, and a heating element disposed in the conduit.

9. In an electrical heating device, a metallic member, a plurality of conduits cast into the member so as to be imbedded therein, said conduits forming a series of passageways opening out of the member, and an electrical heating element threaded through the conduits.

10. In an electrical cooking utensil, a metallic base member, walls cast integrally with the base member and forming a cooking chamber, a plurality of conduits cast into the base so as to be imbedded therein, said conduits forming a series of passageways opening out of the base, and an electrical heating element threaded through the conduits.

In testimony whereof, I have hereunto set my hand.

ARTHUR J. KERCHER.